United States Patent [19]

Ojima et al.

[11] Patent Number: 5,275,262
[45] Date of Patent: Jan. 4, 1994

[54] PEDAL PARKING BRAKE DEVICE

[75] Inventors: Juji Ojima, Kanagawa; Yoshiharu Kitamura; Kouichi Yamamuro, both of Nagano, all of Japan

[73] Assignee: NHK Spring Co., Ltd., Yokahama, Japan

[21] Appl. No.: 812,813

[22] Filed: Dec. 24, 1991

[30] Foreign Application Priority Data

Dec. 28, 1990 [JP] Japan .................. 2-417229

[51] Int. Cl.$^5$ .............................. F16D 69/00
[52] U.S. Cl. ..................... 188/82.6; 192/8 C; 192/12 BA; 192/41 S; 188/265
[58] Field of Search ............ 188/265, 77 W, 82.1, 82.6; 74/529, 74/531; 192/8 C; 12 BA, 415, 17 D

[56] References Cited

U.S. PATENT DOCUMENTS

| | | | |
|---|---|---|---|
| 1,914,510 | 6/1933 | Johnson et al. | 192/8 C |
| 3,136,177 | 6/1964 | Roberts et al. | 188/82.6 |
| 3,149,500 | 9/1964 | Swats et al. | 188/82.6 |

Primary Examiner—Robert J. Oberleitner
Assistant Examiner—Lee W. Young
Attorney, Agent, or Firm—Keck, Mahin & Cate

[57] ABSTRACT

A pedal parking brake device makes it possible to provide a brake retaining state at the maximum braking position. The pedal parking brake device performs a rotational locking of a brake pedal by a coil spring provided at a rotatably supporting position of the brake pedal and includes a supporting shaft fixedly provided at a base plate, a cylindrical core bar loosely and rotatably inserted into the supporting shaft, a brake pedal rotatably attached to a center of the supporting shaft, a brake plate in which a brake hole is provided, integrally formed with the core bar, and a release plate for the coil spring. An outer coil spring is outwardly inserted to the core bar and an inner coil spring is provided at the inner side of the core bar so that its outer diameter may be separately connected with the inner periphery of the core bar. An operation of the parking brake and brake locking are performed by continuously connecting both coil springs to the brake pedal.

3 Claims, 7 Drawing Sheets

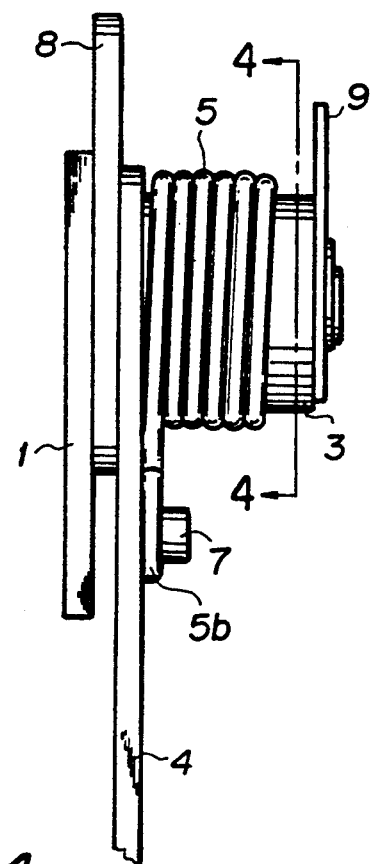
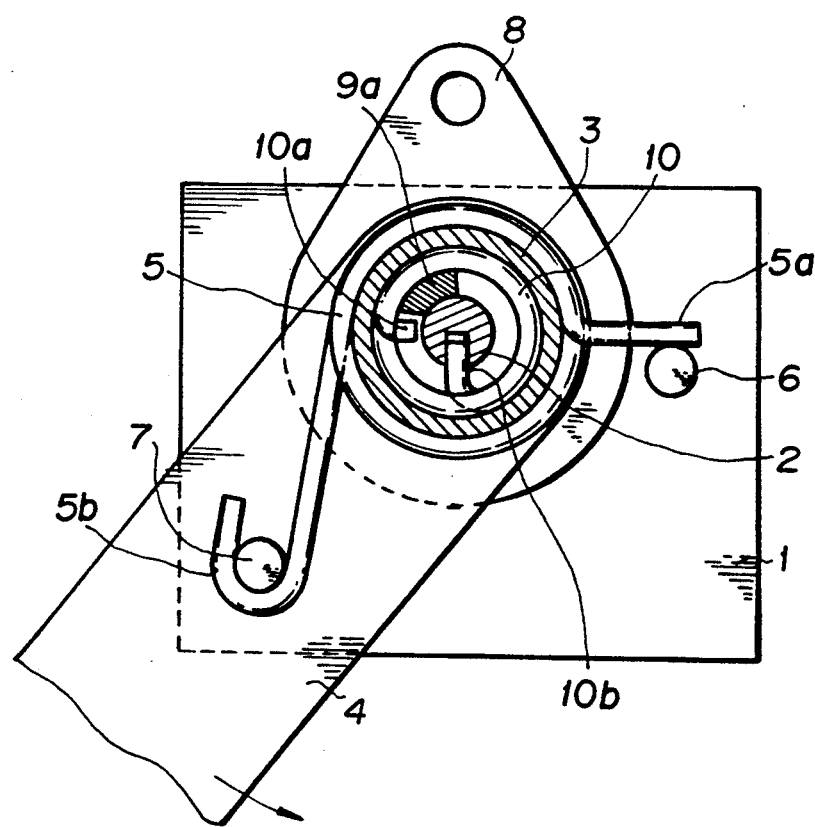

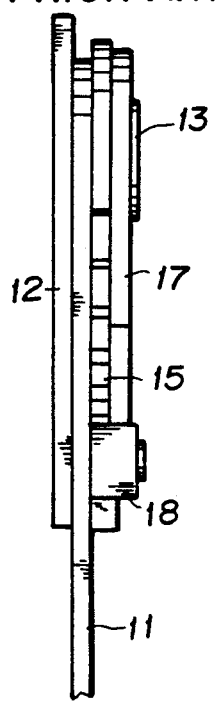
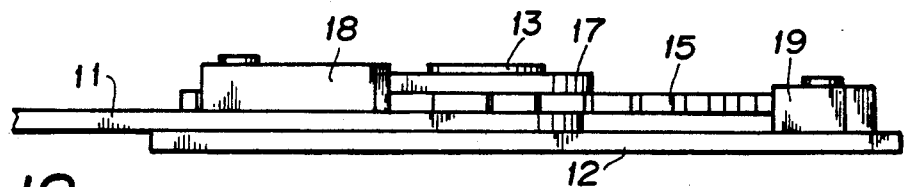
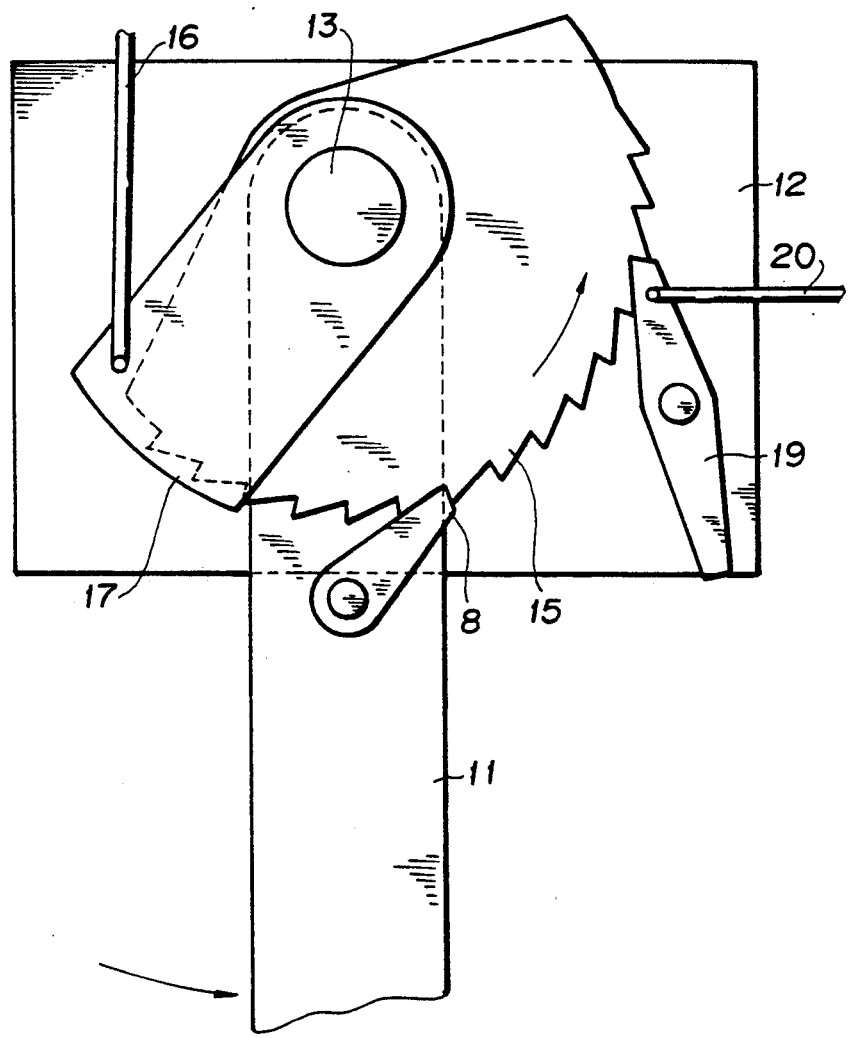

PEDAL PARKING BRAKE DEVICE

BACKGROUND OF THE INVENTION

This invention relates to a pedal parking brake device which actuates a parking brake of the wheels of a car or the like, and performs a release thereof.

Heretofore, as such kind of a pedal parking brake device there exists a brake device as shown in FIG. 10 through FIG. 14. In this brake device, a brake pedal 11 is attached, at its base portion, to a supporting shaft 13 fixed to a base plate 12 rotatably and being energized, in a return direction (a direction), by aid of a return spring 14.

A ratchet 15 is attached to the supporting shaft 13 rotatably, said ratchet 15 being connected to one end of a brake cable 16.

A cam plate 17 is provided with a circular cam surface 17a at the top end of the cam plate 17 and the base portion thereof is fixed to the supporting shaft 13.

Further, the brake pedal 11 is provided with a ratchet pawl 18 energized in a latching direction of the ratchet 15 and the base plate 12 is provided with a locking pawl 19 energized in a latching direction of the ratchet 15. The locking pawl 19 is connected to an end of a release cable 20.

In a conventional brake device, when the brake pedal 11 is rotated in b direction by stepping on the pedal brake 11 with the foot from an initial state (FIG. 10) wherein the ratchet pawl 18 is released from latching with ratchet 15 by abutting the top end thereof against the cam surface 17a of the cam plate, the ratchet pawl 18 rotates integrally with the pedal 11 whereby the top end thereof comes off from the cam surface 17a. The ratchet pawl 18, which comes off from the cam surface 17a, latches with the ratchet 15 to rotate the ratchet 15 in the same direction as the pedal 11 by latching with ratchet 15 (FIG. 13).

By this rotation, the brake cable 16 is drawn out to brake whereby the ratchet 15 latches with a lock pawl 19. In this state, when the foot is separated from the pedal 11, the pedal 11 returns to its original position by aid of a return spring 14 as shown in FIG. 14. However, the ratchet 15 is retained at the position after rotation by latching with the lock pawl 19 to maintain a braking state (brake maintaining state).

In this case, when the first step on the brake fails to produce an effective braking, a second stepping is necessary to effectively brake.

Further, the release of the above braking state is performed by releasing the latching ratchet 15 with the lock pawl 19 by pulling a release cable 20. By this release, the ratchet 15 returns to its original position (FIG. 10) by aid of the pulling force of the brake cable 16 to maintain the initial state. Since the pedal 11 is already returned to the original position at the time of the return of the ratchet 15, a shocking return operation of the pedal 11 does not occur and a stable operation is obtained.

However, since the brake retaining state in the conventional pedal parking brake device is obtained by latching ratchet 15 with lock pawl 19, it is impossible to retain the maximum braking position in spite of the fact that pedal stepping position is a maximum brake position, and the ratchet 15 returns in the return direction by 1 pitch of the ratchet 15 in order to latch with lock pawl 19 and also the brake cable 16 returns in the same direction. Accordingly, the conventional pedal parking brake device has such a difficult problem obtaining a brake retaining state at the maximum braking position.

Further, if the pitch of the ratchet 15 lessens, the amount of return of the ratchet 15 and the brake cable 16 can be decreased. However, if the pitch lessens too much, the teeth portion of the ratchet 15 decreases in strength, which becomes impractical.

This invention is performed in view of this problem. The object of this invention is to provide a pedal parking device which can obtain a brake retaining state at the maximum brake position.

SUMMARY OF THE INVENTION

In order to attain this object, this invention is characterized by a pedal parking brake device which performs a rotary locking of the brake pedal by a coil spring provided at a supporting portion of the brake pedal. The pedal parking brake device comprises:

a supporting shaft fixedly provided at a base plate, and a cylindrical core bar loosely inserted to the supporting shaft rotatably;

a brake pedal rotatably attached with a center of the supporting shaft;

a brake plate wherein a brake cable integrally formed with the core bar is connected thereto;

a release plate of the above coil spring; and an outer coil spring outwardly inserted to the core bar, and an inner coil spring provided at the inner side of the core bar so that the outer diameter thereof may be separably contacted with the inner periphery of the core bar. An operation of the parking brake and the brake lock is made by continuously connecting both coil springs to the brake pedal.

When the brake pedal is rotated in a counter-clockwise direction by stepping on it, the diameter of the coil spring is decreased to clamp the core bar because one end of the outer coil spring separates from the pin of the base side. When the core base is clamped, the core bar also rotates with the brake pedal, and further, the brake plate integrated with the core base also rotates, whereby the brake is applied.

At this time, the core bar rotates in a diameter-shrinking direction and the inner coil spring slips. In this case, though the action of the core bar is not disturbed, when the foot separates from the brake pedal, the brake plate and the core bar rotate in a clockwise direction to return by the reaction force of the brake. Since this return rotation is a rotation in a diameter-enlarging direction of the inner coil spring, the inner coil spring enlarges its diameter and urges the inner periphery of the core bar thereby locking the rotation in the above direction instantly by the friction force, to maintain the brake retaining state. In this case, the brake pedal returns to its original position exclusively because this is energized by the return spring in the clockwise direction.

When the released plate is rotated, a projection engages with a free end of the inner coil spring whereby the coil diameter is allowed to move in the diameter-shrinking direction. By this, the friction force between the core bar and the inner coil spring is caused to disappear, and the brake plate and the core bar return to their original positions, respectively, whereby the lock is released.

BRIEF DESCRIPTION OF THE DRAWINGS

FIG. 3 is a side view of this embodiment. FIG. 4 is a sectional view along line A—A in FIG. 3.

FIG. 11 is an elevation view shown by arrow B in the conventional embodiment in FIG. 10.

FIG. 12 is a side view shown by arrow C in the conventional embodiment of FIG. 10.

FIG. 13 is a plan view which shows the conventional operation state in FIG. 10.

DETAILED DESCRIPTION OF THE INVENTION

Figure 1:
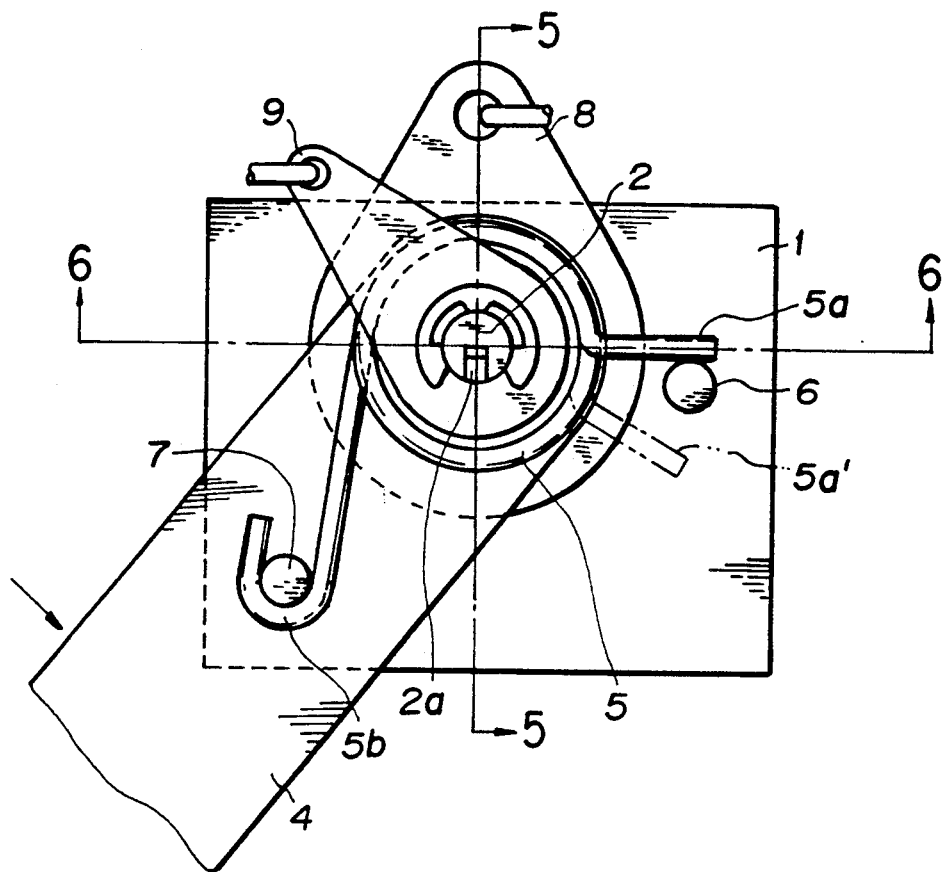
FIG. 1 is a plan view which shows an embodiment of this invention.
Figure 2:
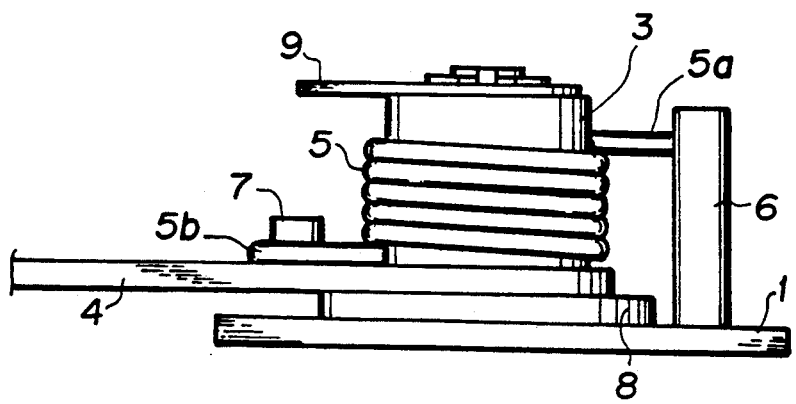
FIG. 2 is an elevation view of this embodiment.
Figure 5:
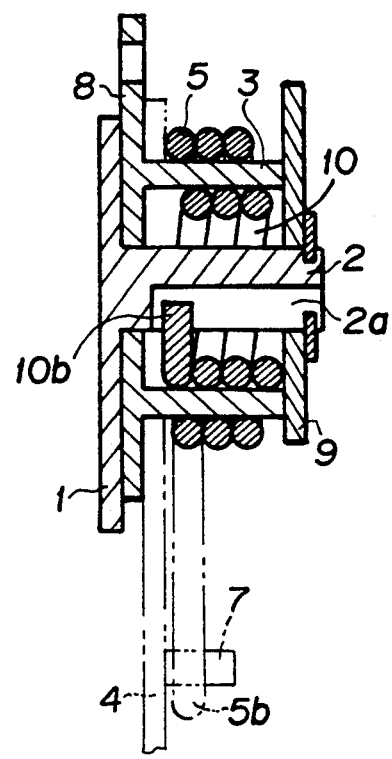
FIG. 5 and FIG. 6 are sectional views along line X—X and line Y—Y in FIG. 1, respectively.
Figure 6:
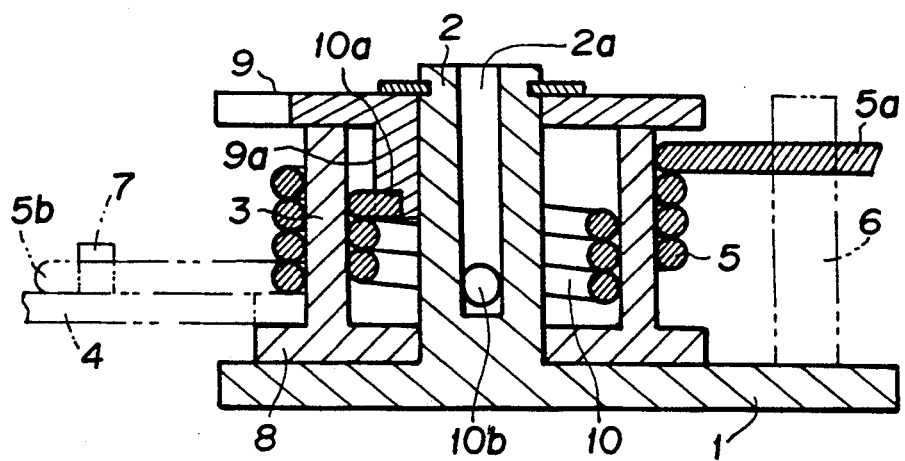

This invention will be described referring to the embodiment based upon illustrated drawings as follows:

FIG. 1 through FIG. 9 represent a pedal parking brake device according to this invention. In the Figs., a supporting shaft 2 is fixed projectingly to a base plate 1 fixed at a car side, said supporting shaft 2 of the base plate 1 being outwardly inserted into a cylindrical core bar 3 in a loose state. The core bar 3 is formed integrally with a brake plate 8, said brake plate 8 being connected to a brake cable (not shown). Further, the supporting shaft 2 is supported by the release plate 9 having a rotatable projection 9a, said release plate 9 being connected to a release cable (not shown).

The brake pedal 4 is rotatably supported by the core bar 3 and at the outer periphery of the core bar 3 is outwardly inserted an outer coil spring 5 in nearly close contact state, one end 5a of the coil spring 5 being abutted against a pin 6 fixed to the base plate 1 separately, while another end hook portion 5b is engaged with a pin 7 fixed to the brake pedal 4. The outer coil spring 5 in this state (state in FIG. 1) abuts against pin 6 by slightly moving the end portion 5a in a counterclockwise direction from the case when the outer coil spring 5 winds around the core bar perfectly, and the inner diameter of the outer coil spring 5 becomes a little larger than the outer diameter of the core bar 3. The position at the end portion 5a' where the outer coil spring 5 winds around the core bar perfectly is shown by a dot-dash line.

At the inner portion of the core bar, an inner coil spring 10 is provided so that the outer diameter thereof may contact or separate from the inner coil spring. When the release plate 9 rotates, one end of the coil spring 10 is fixed to a free end 10a engaged with the projection 9a, while another end 10b is fixed to a slit 2a provided at the supporting shaft 2. The inner coil spring 10 in this state (state in FIG. 4) is set to the core bar 3 by shrinking the outer diameter thereof a little from the inner diameter of the core bar 3.

Figure 7:
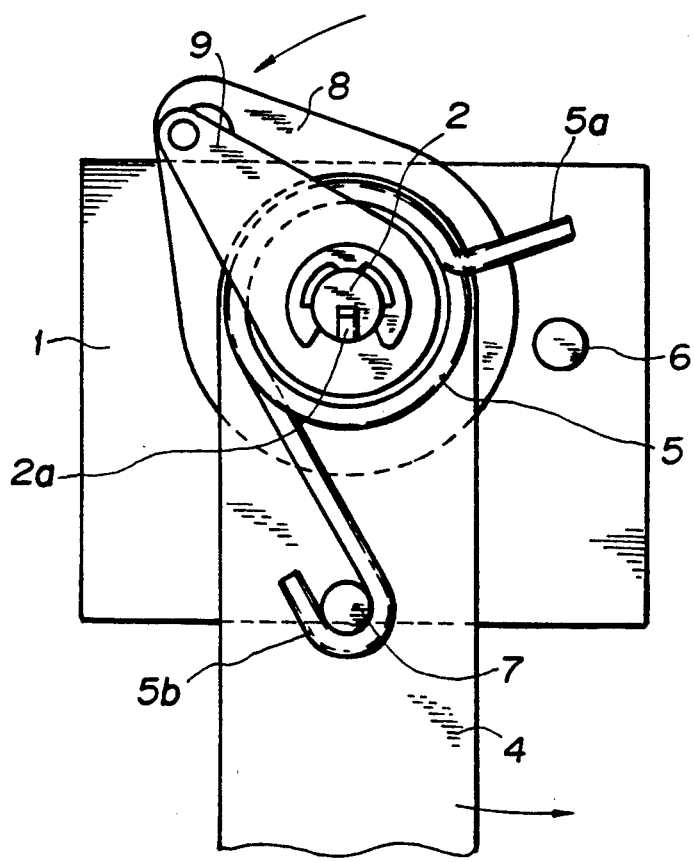
FIG. 7 is a plan view which shows an operation state and FIG. 8 and FIG. 9 are plan views which show other operation states, respectively.
Figure 8:
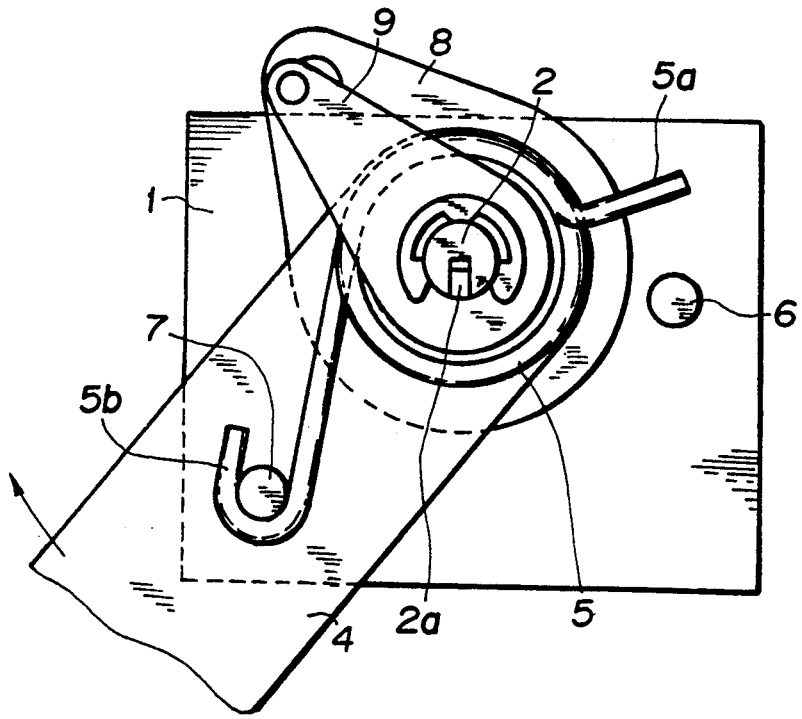

Since the construction of this embodiment is as described above, when the brake pedal 4 is stepped in the counter-clockwise direction in FIG. 1 and FIG. 4, the other end 5b of the outer coil spring 5 rotates together with the brake pedal 4 because the other end 5b of the outer coil spring 5 is engaged with pin 7 of the brake pedal 4 whereby the one end 5a is separated from the pin 6 of the base plate 1 (state in FIG. 7). When the end portion 5a of the outer coil spring 5 is separated from the pin 6, the slightly enlarged diameter of the outer coil spring 5 shrinks a little instantly and clamps the core bar 3. Accordingly, if the brake pedal 4 is stepped on still more, the core bar 3 also rotates together with the brake pedal 4 by aid of the friction force of the outer coil spring 5 and the core bar 3 because the core bar 3 is clamped with the outer coil spring 5. Since the core bar 3 is integrated with the brake plate 8, when the core bar rotates, the brake plate 8 also rotates (FIG. 7) thereby pulling a brake cable (not shown) connected to this brake plate 8 to make the braking state. At this time, since the core bar rotates in the diameter-shrinking direction, the inner coil spring 10 slips against the core bar and does not disturb the movement of the core bar.

Then, if the foot separates from the brake pedal 4, the brake plate 8 and the core bar 3 rotate in a clock-wise direction by the reaction force of the brake to return to the original position. However, in this return rotation, the inner coil spring 10 enlarges its diameter instantaneously due to the rotation of the inner coil spring 10 in the diameter-enlarging direction and urges the inner periphery surface of the core bar. Accordingly, this rotation is locked instantaneously due to the friction force of the inner coil spring 10 and the inner periphery surface of the core bar 3 whereby the brake retaining states are maintained. However, the brake pedal 4 returns to the original position (initial state) exclusively (FIG. 8) because the brake pedal 4 is energized in a clockwise direction by a return spring (not shown). In this case, if the action of the brake is weak, it is possible to make a maximum brake state by stepping again on the brake pedal 4 which returns to the initial state.

Then, the release of the brake retaining state is performed as follows.

Figure 9:
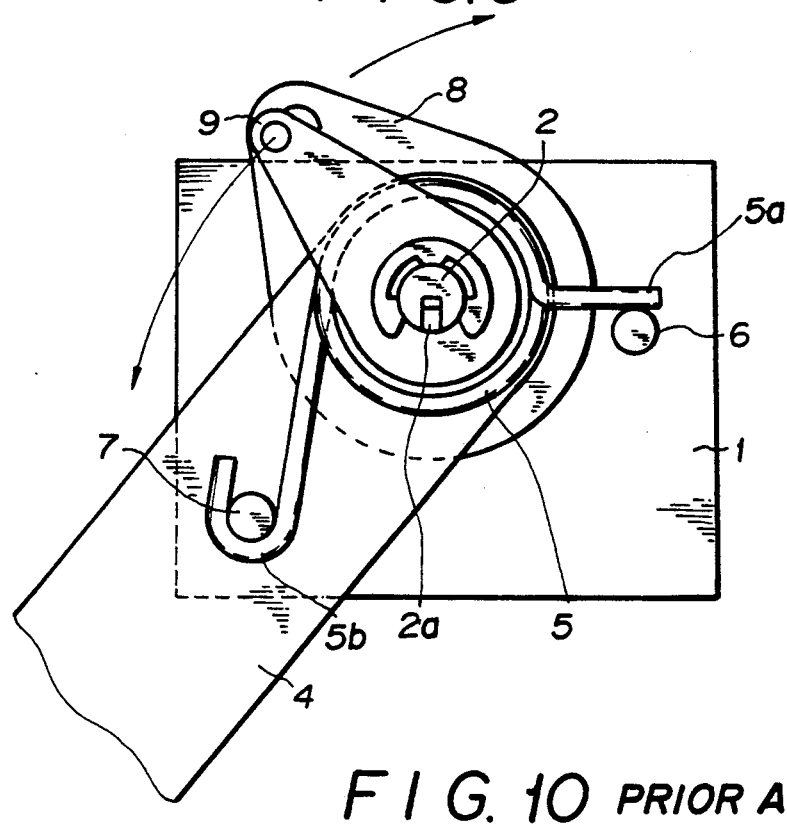
Figure 10:
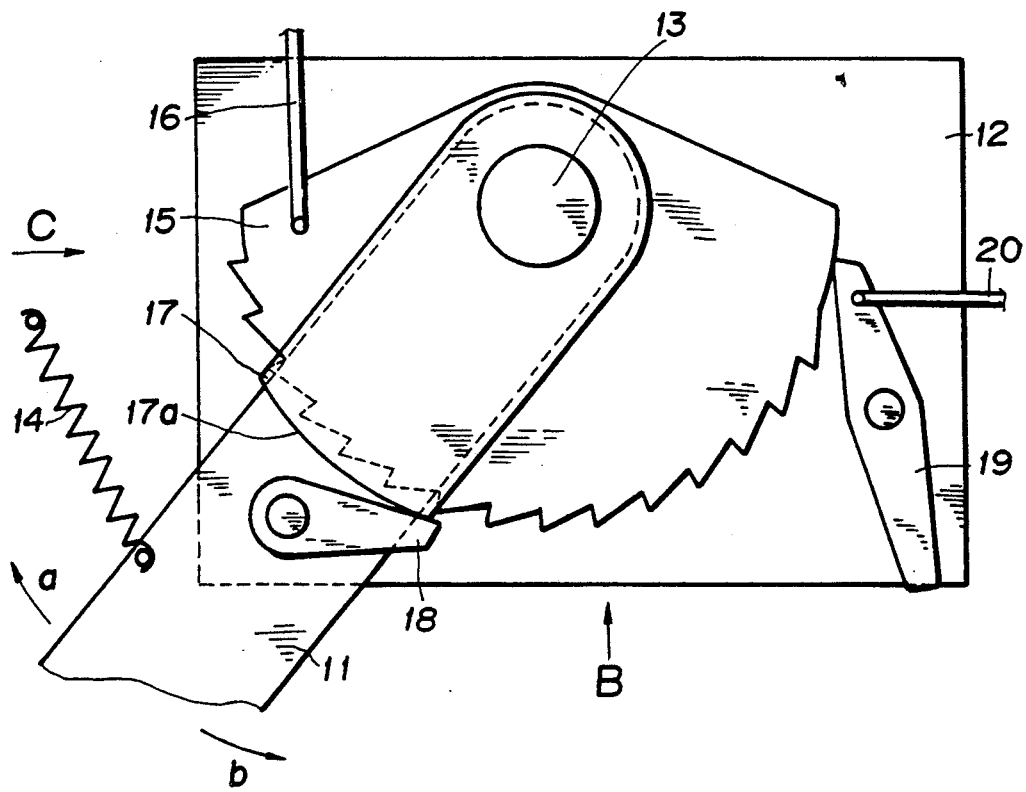
FIG. 10 is a plan view in the conventional embodiment.
Figure 14:
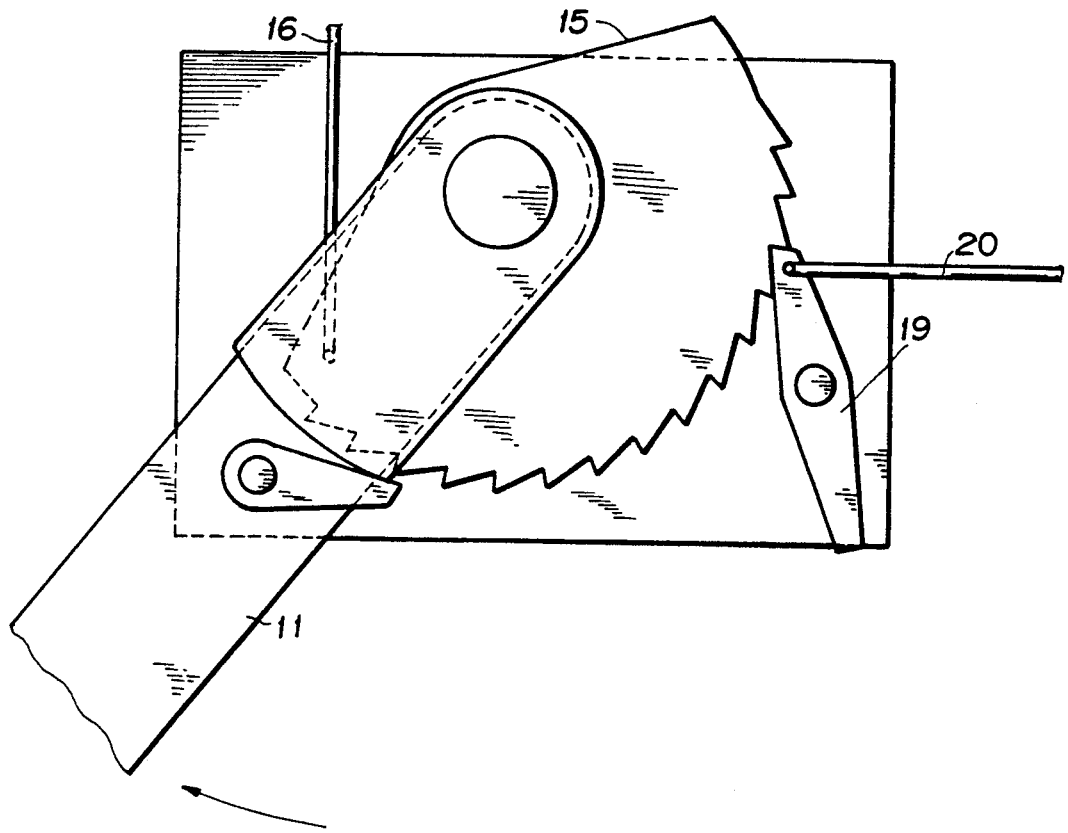
FIG. 14 is a plan view which shows the conventional operation state in FIG. 10.

When the release cable (not shown) connected to the release plate 9 is pulled, the release plate 9 rotates and the projection 9a engages with the free end 10a of the inner coil spring 10 to move the inner coil spring 10 in the direction which shrinks the coil diameter. When the inner coil spring shrinks its diameter, the friction force of the core bar 3 and the inner coil spring 10 disappears. In this case, one end of the outer coil spring abuts against the pin 6 and enlarges its diameter. Accordingly, the brake plate and the core bar 3 return to the original position (initial state) and the lock is released (FIG. 9).

At the time the brake is released, since the brake pedal 4 is returned already to the original position (initial state), a shocking return operation of the brake pedal 4 does not occur, making it safe.

This invention is, as described above, able to lock the rotating of the brake pedal instantaneously by aid of instant diameter enlargement of the inner coil spring. Accordingly, a return of the brake cable at the time the brake pedal is stepped on is none or very minimal if it exists, whereby the brake can be retained at this position and maximum brake state is always maintained.

What we claim is:

1. A pedal parking brake device for maintaining a braking state of a brake pedal comprising:
    a base plate having a supporting shaft defining a pivotally supporting portion;
    a brake plate connected with a brake cable, said brake plate including a cylindrical core member integrally formed therewith and coaxial with said pivotally supporting portion;
    a release plate connected with a release cable, said brake plate and said release plate being coaxially and pivotally supported on said pivotally supporting portion of said base plate; and an outer coil spring and an inner coil spring wound closely outside and inside, respectively, of said cylindrical core member;

one end of said outer coil spring being secured to said brake pedal, the other end of said outer coil spring being free, said outer coil spring being wound around said cylindrical core member so as to transfer a braking direction rotation of said brake pedal to said brake plate;

one end of said inner coil spring being secured to said supporting shaft at said supporting portion, another end of said inner coil spring being free, said inner coil spring being wound inside said cylindrical core member so as to friction-lock a brake-releasing direction rotation thereof;

said release plate being installed so as to turn on pulling of said release cable and allow said cylindrical core member to rotate in a brake-releasing direction by abutting said other end of said inner coil spring, resulting in a contraction thereof.

2. A pedal parking brake device according to claim 1, wherein the release plate is provided with a projection for engaging said other end of said inner coil spring.

3. A pedal parking brake device according to claim 1 wherein the release plate is connected to a release cable.

* * * * *